United States Patent
Maynard (10) Patent No.: US 11,779,501 B2
(45) Date of Patent: Oct. 10, 2023

(54) TRAVERSE DENTAL CHAIR AND A SENSOR ASSEMBLY FOR MONITORING POSITIONS THEREOF

(71) Applicant: Engle Dental Systems, LLC, Hillsboro, OR (US)

(72) Inventor: David Maynard, North Plains, OR (US)

(73) Assignee: Engle Dental Systems, LLC, Hillsboro, OR (US)

( * ) Notice: Subject to any disclaimer, the term of this patent is extended or adjusted under 35 U.S.C. 154(b) by 319 days.

(21) Appl. No.: 16/573,415

(22) Filed: Sep. 17, 2019

(65) Prior Publication Data

US 2021/0077332 A1     Mar. 18, 2021

(51) Int. Cl.
| | |
|---|---|
| *A61G 15/02* | (2006.01) |
| *F15B 11/10* | (2006.01) |
| *F15B 15/28* | (2006.01) |
| *G01D 5/165* | (2006.01) |

(52) U.S. Cl.
CPC .............. *A61G 15/02* (2013.01); *F15B 11/10* (2013.01); *F15B 15/2853* (2013.01); *G01D 5/165* (2013.01); *A61G 2203/36* (2013.01); *A61G 2203/40* (2013.01); *F15B 2211/6336* (2013.01); *F15B 2211/7053* (2013.01); *F15B 2211/7656* (2013.01)

(58) Field of Classification Search
CPC ............................ A61G 15/02; A47C 1/03294
See application file for complete search history.

(56) References Cited

U.S. PATENT DOCUMENTS

| | | | | | |
|---|---|---|---|---|---|
| 3,338,632 | A | * | 8/1967 | Kleinsorge | A61G 15/02 |
| | | | | | 297/330 |
| 3,726,191 | A | * | 4/1973 | Johnston | F15B 15/2853 |
| | | | | | 92/5 R |
| 3,806,192 | A | * | 4/1974 | Ohlrogge | A47C 1/04 |
| | | | | | 297/318 |

(Continued)

FOREIGN PATENT DOCUMENTS

| | | | | |
|---|---|---|---|---|
| DE | 3534341 A1 | * | 4/1987 | ............. A61G 15/02 |
| DE | 3534341 A1 | | 4/1987 | |

(Continued)

OTHER PUBLICATIONS

Authorized Officer Claire Masterson-Zwinkels, International Search Report and the Written Opinion, International Patent Application PCT/US2020/045760, Completion Date Oct. 14, 2020, 16 pp.

*Primary Examiner* — Thomas E Lazo
(74) *Attorney, Agent, or Firm* — Offit Kurman, P.A.; Gregory A. Grissett (57) ABSTRACT

An embodiment of the present disclosure a dental chair a chair assembly configured to support a patient. The dental chair also includes a traverse motion assembly coupled to the chair assembly that move the chair assembly in a forward-backward direction. The dental chair also includes a sensor assembly having a rod rotatably fixed to the traverse motion assembly. The rod defines a first end, a second end opposite the first end, and a rod cross-sectional shape. The dental chair also includes a sensor assembly is configured to obtain data indicative a distance of linear movement of the chair assembly along the forward-backward direction between.

22 Claims, 6 Drawing Sheets

(56) References Cited

U.S. PATENT DOCUMENTS

| | | | | |
|---|---|---|---|---|
| 3,915,070 A | * | 10/1975 | Mailliet | F15B 15/2823 |
| | | | | 92/5 R |
| 4,128,797 A | * | 12/1978 | Murata | A61G 15/02 |
| | | | | 297/330 |
| 4,505,514 A | * | 3/1985 | Stockl | A61G 15/02 |
| | | | | 297/316 |
| 4,549,124 A | * | 10/1985 | Beier | G05B 19/351 |
| | | | | 318/624 |
| 4,552,055 A | * | 11/1985 | Foxwell | F15B 15/2823 |
| | | | | 91/1 |
| 4,572,573 A | * | 2/1986 | Yoshikawa | A47C 1/06 |
| | | | | 297/330 |
| 5,015,035 A | * | 5/1991 | Stoeckl | A61G 15/02 |
| | | | | 297/330 |
| 5,320,415 A | * | 6/1994 | Krebs | A61G 15/02 |
| | | | | 297/411.32 |
| 5,348,375 A | * | 9/1994 | Steininger | A61G 15/02 |
| | | | | 297/344.14 |
| 5,484,188 A | * | 1/1996 | Stoeckl | A61G 15/02 |
| | | | | 297/217.3 |
| 5,624,159 A | * | 4/1997 | Celoni | A47C 1/0248 |
| | | | | 297/325 |
| 6,106,065 A | * | 8/2000 | Carroll | A47C 1/0347 |
| | | | | 297/325 |
| 9,064,427 B2 | * | 6/2015 | Shibui | G09B 23/28 |
| 9,500,476 B2 | * | 11/2016 | Mikesell | F16H 25/2015 |
| 2011/0049956 A1 | * | 3/2011 | Spivey | A47C 1/03294 |
| | | | | 297/354.12 |
| 2018/0221231 A1 | * | 8/2018 | Harlacher | F15B 15/2853 |

FOREIGN PATENT DOCUMENTS

| | | | | |
|---|---|---|---|---|
| DE | 4224659 C1 | * | 11/1993 | A47C 20/041 |
| FR | 2771503 A1 | | 5/1999 | |
| GB | 1437015 A | * | 5/1976 | A61G 15/02 |

* cited by examiner

TRAVERSE DENTAL CHAIR AND A SENSOR ASSEMBLY FOR MONITORING POSITIONS THEREOF

TECHNICAL FIELD

The present disclosure relates to a traverse dental chair, and in particular, to a sensor assembly for monitoring positions of a traverse dental chair.

BACKGROUND

Dental chairs support a dental patient during a dental procedure while also providing for ergonomic configurations to accommodate dental practitioners, such as the dentist and other staff. Typical dental chairs allow the chair to be elevated, lowered, or recline, to position the patient in the appropriate position for the procedure. Dental chairs are configured to account for different practitioner requirements and preferences, while also providing a comfortable resting surface for the patient. Various types of control systems, sensors, and interfaces are used to select chair position and control movement of the chair from one position to another.

SUMMARY

There is a need for improved sensors assemblies to aid in the control and operation of adjustable dental chairs. An embodiment of the present disclosure includes a dental chair having a chair assembly configured to support a patient. The dental chair also includes a traverse motion assembly coupled to the chair assembly. The traverse motion assembly is configured to move the chair assembly in a forward-backward direction between a first position and a second position. The dental chair also includes a sensor assembly having a rod rotatably fixed to the traverse motion assembly. The rod defines a first end, a second end opposite the first end, and a rod cross-sectional shape. The dental chair also includes a bracket plate fixed to the chair assembly so that the bracket plate moves with the chair assembly in the forward-backward direction. The bracket plate defines an opening having a bracket plate cross-sectional shape through which the rod extends. The bracket plate cross-sectional shape corresponds to the rod cross-sectional shape such that movement of the chair assembly in the forward-backward direction causes rotation of the rod. The dental chair also includes a potentiometer positioned proximate the rod. The potentiometer is configured to obtain data indicative of rotational movement of the rod. The data indicative of rotational movement of rod corresponds a distance of linear movement of the chair assembly along the forward-backward direction between the first position and the second position.

Another embodiment of the present disclosure includes a sensor assembly for a dental chair having a traverse motion assembly. The sensor assembly has a rod configured to be rotatably fixed to the traverse motion assembly. The rod defines a first end, a second end opposite the first end, and a rod cross-sectional shape. The sensor assembly also includes a bracket plate an opening having a bracket plate cross-sectional shape. The bracket plate cross-sectional shape corresponds to the rod cross-sectional shape such that movement bracket plate in the forward-backward direction causes rotation of the rod. The sensor assembly also includes a potentiometer configured to be coupled to the traverse motion assembly, wherein the potentiometer is configured to obtain data indicative of rotational movement of the rod. The sensor assembly also includes a processor coupled to the potentiometer, the processor configured to determine a linear distance traveled by the chair in the forward-backward direction based on the data indicative of rotational movement of the rod obtained by the potentiometer.

An embodiment of the present disclosure includes a method that includes selecting a desired position of a dental chair with an interface of a control system. The method also includes determining a linear distance between a current position of the dental chair and the desired position of the dental chair. The method also includes causing the dental chair to traverse along a forward-backward direction from the current position to toward the desired position. The method also includes determining, with a sensor assembly and a processor, a distance of linear movement of the dental chair along the forward-backward direction. The distance of linear movement is determined based on rotational movement of a rod caused by traverse of the dental chair along forward-backward direction. The method also includes stopping traverse of the dental chair along the forward-backward direction when the distance of linear movement is substantially equal to the linear distance determined between the current position of the dental chair and the desired position of the dental chair.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings, illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1:
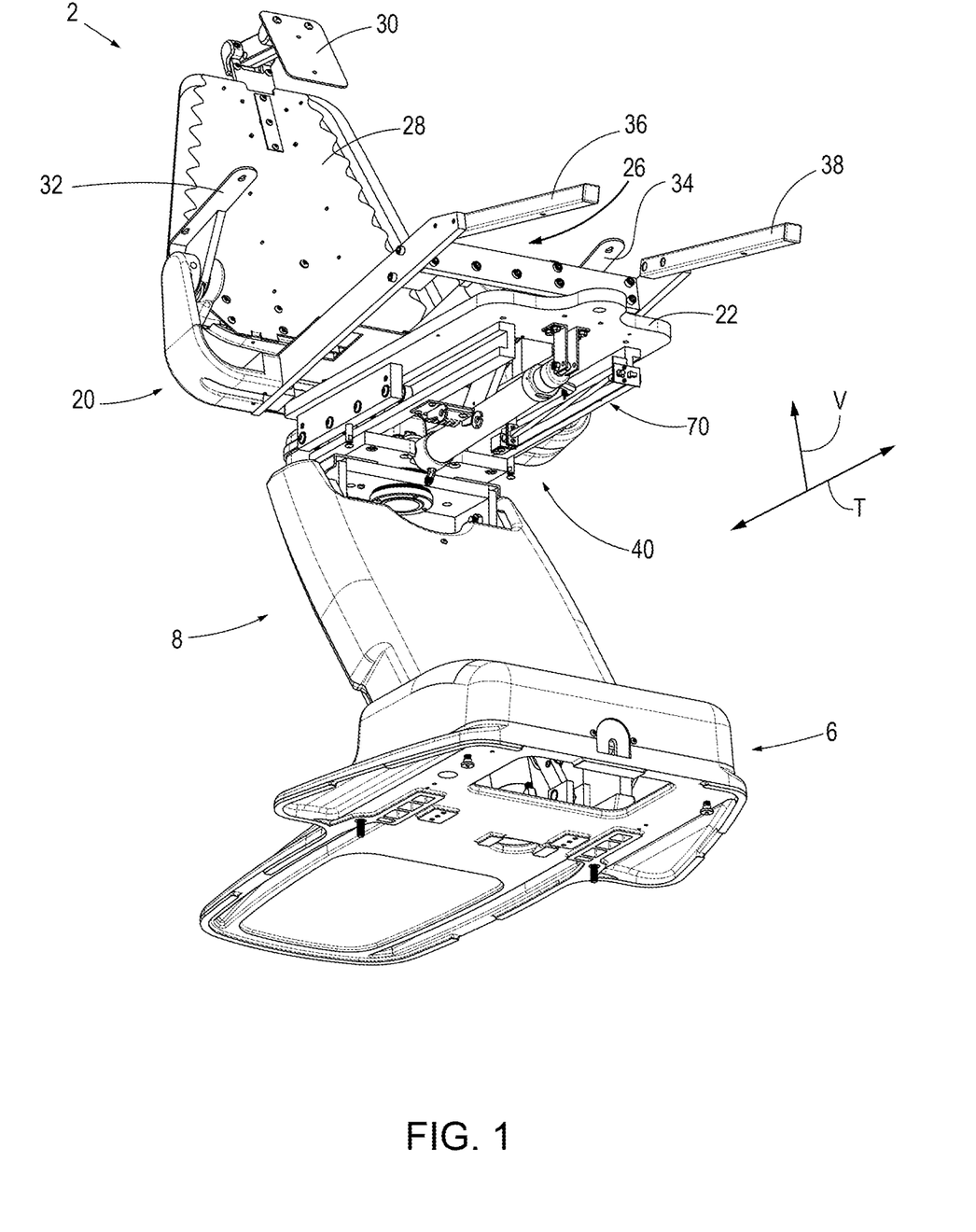
FIG. 1 is a bottom perspective view of a dental chair according to an embodiment of the present disclosure.

Referring to FIG. 1, embodiments of the present disclosure include a dental chair 2. The dental chair 2 is configured to support a dental patient during a dental procedure. The dental chair 2 may be elevated, lowered, recline, and/or traverse to position the patient in the appropriate position. The dental chair 2 includes a base 6 that rests on the floor or flat surface, a height adjustment assembly 8, a chair assembly 20 is coupled to height adjustment assembly 8, and a traverse motion assembly 40 coupled to chair assembly 20. The height adjustment assembly 8 is configured to move the chair assembly 20 between a lowered and a raised position along a vertical direction V. The traverse motion assembly 40 is configured to move, or traverse, the chair assembly 20 in a forward-backward direction T, as will be further described below. The dental chair 2 includes a sensor assembly 70 configured to determine a distance the chair assembly travels along the forward-backward direction T, which may then be used to aid in operation of dental chair 2.

Continuing with FIG. 1, the chair assembly 20 includes a platform 22, a seat assembly 26 coupled to the platform 22, a back 28 coupled to the seat assembly 26, a headrest 30 coupled to the back 28, a pair of armrests 32 and 34 that extend relative to the back 28 for a patient's arms, and a pair of leg supports 36 and 38 that extend from the seat assembly 26. The dental chair 2 as shown does not include cushions; only the internal components of each part of the chair assembly 20 are illustrated.

Figure 2:
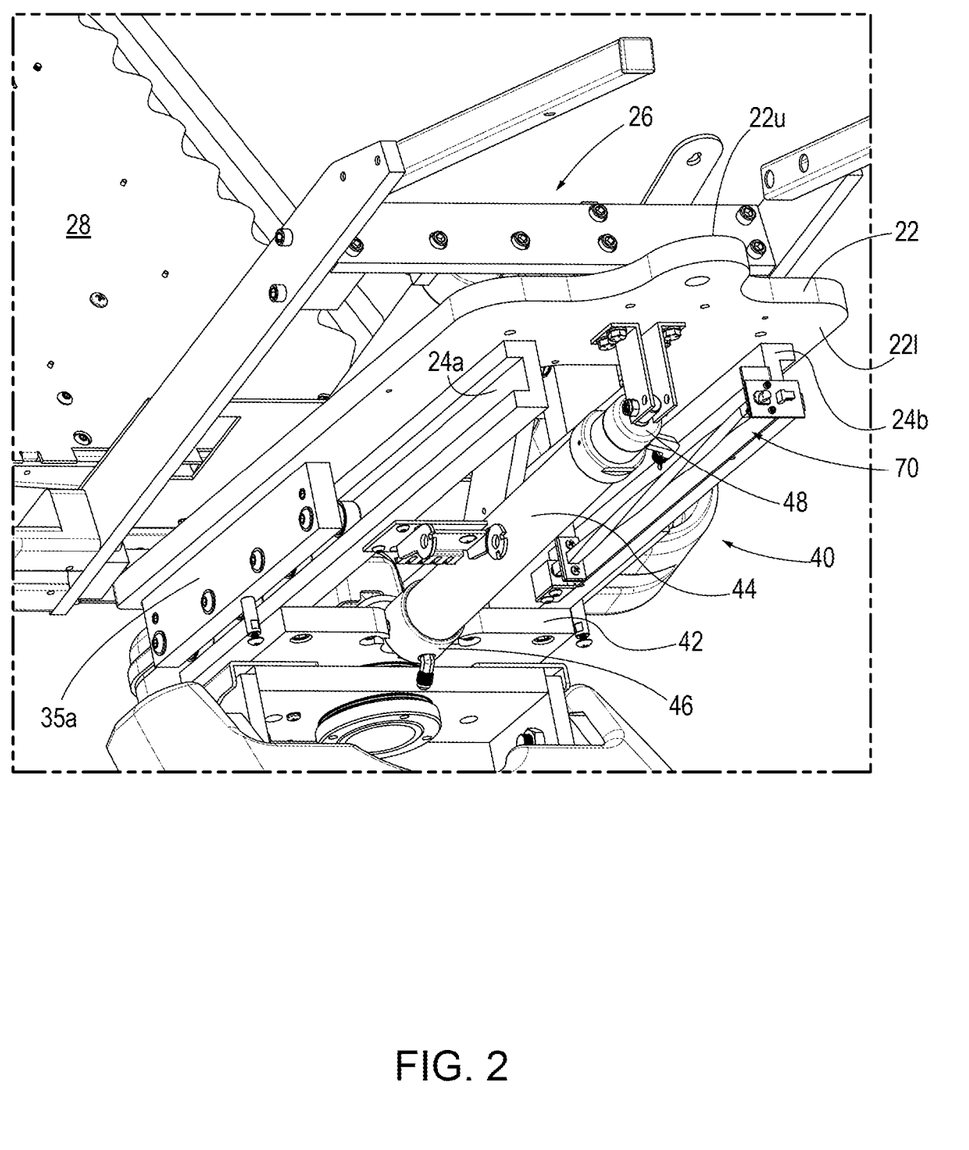
FIG. 2 is a detailed view of a portion of the dental chair shown in FIG. 1, illustrating a traverse motion assembly, according to an embodiment of the present disclosure.

Referring to FIGS. 1 and 2, the platform 22 is configured to support the seat assembly 26 and couple to the traverse motion assembly 40. As shown, the platform 22 is generally planar plate having an upper surface 22u and a lower surface 22l, the platform 22 includes a pair of roller assemblies 35a and 35b coupled to the lower surface 22l. The roller assembly 35b is not shown in the drawing due to the viewing angle.

As shown in FIGS. 1 and 2, the traverse motion assembly 40 is configured to traverse the chair assembly 20 in a forward-backward direction T. The traverse motion assembly 40 and sensor assembly 70 is shown coupled to a lower surface of the platform 22. The traverse motion assembly 40 includes a mounting plate 42 and a pair of guide tracks 24a and 24b coupled to the mounting plate 42 and that receive the pair of roller assemblies 35a and 35b, respectively. The traverse motion assembly 40 also includes a control system 50 used to control traverse movement of the chair assembly 20.

Figure 3:
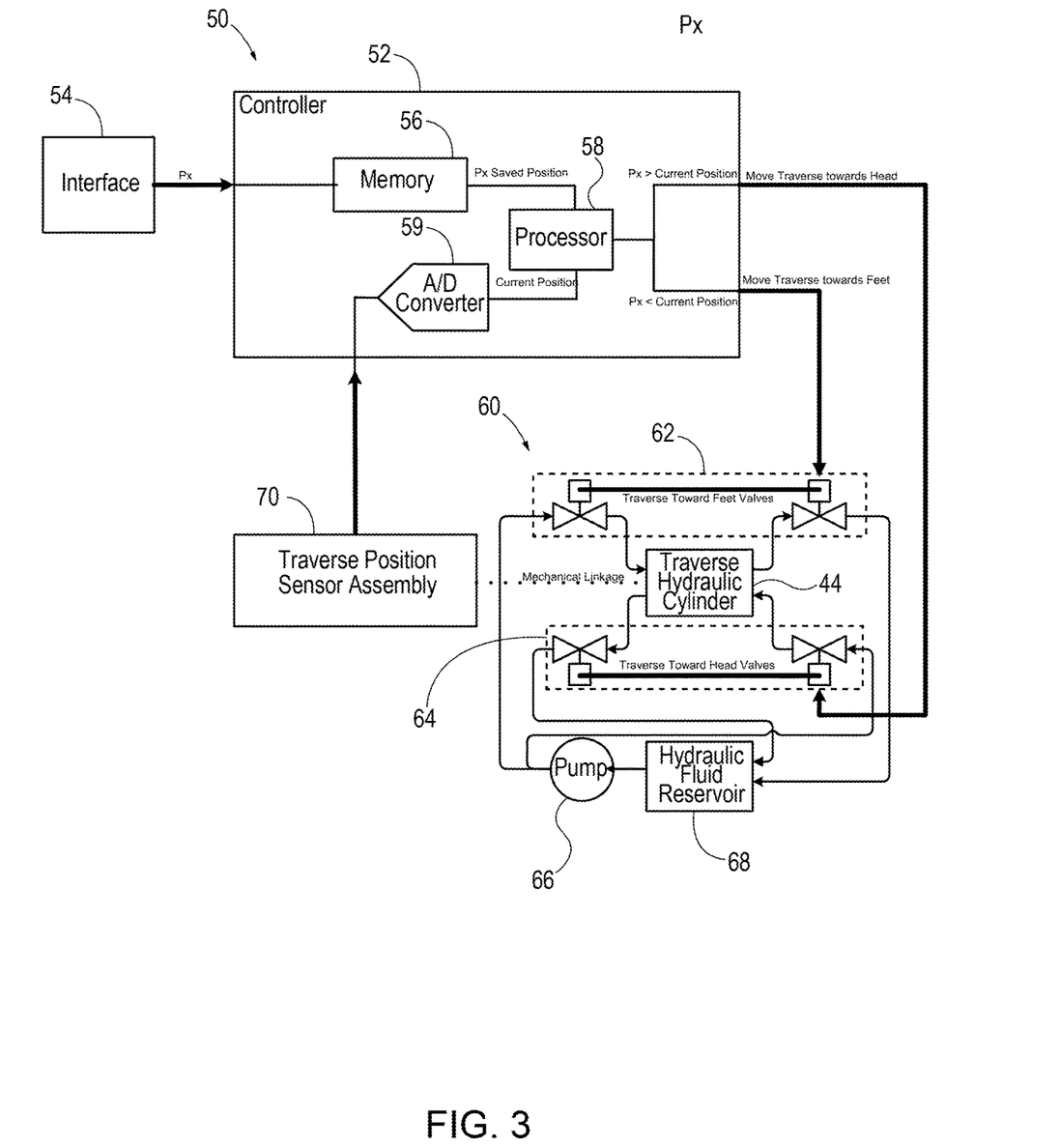
FIG. 3 is an exemplary schematic diagram illustrating a control system for the dental chair shown in FIG. 1.

Turning next to FIG. 3, the control system 50 includes a controller 52 and a hydraulic system 60. The controller 52 may include an interface 54, a memory unit 56, and one or more processors 58. The interface 54 may is configured to receive inputs from a user and display output to the user. Accordingly, the interface 54 may include a screen, inputs, or other features to record user input and/or display system information to the user. The memory unit 56 is a typical medium used to store data, such as preloaded chair positions, data logs, software for operation of the control system 50, firmware, as well as other software applications as is known in the art. The control system 50 may further include various electronic components, such as an analog/digital converter 59 to convert analog signals to digital signals, which are processed by the processor 58. The processor 58 is configured to execute instructions, for example, such as to process data obtained from the sensor assembly 70 and/or sending control signals to the valve assemblies of the hydraulic system 60 as further explained below.

Referring to FIGS. 2 and 3, the hydraulic system 60 includes a cylinder assembly 44 used to control motion of the platform 22. As shown in FIG. 2, the cylinder assembly 44 has a first end 46 coupled to the mounting plate 42, and a second end 48 coupled to the platform 22. The cylinder assembly 44 includes a piston (not shown or numbered) that includes the second end 48 and is partially disposed in a housing (not numbered). The piston and housing form a reservoir for hydraulic fluid. As further explained below, the activation of the cylinder assembly 44, e.g. such as through extension or retraction of the piston, causes the platform 22 to move along the guide tracks 24a and 24b as needed. Because the seat assembly 26 and back 28 are coupled to the platform 22, movement of the platform 22 effectively moves the chair assembly 20 along with it.

The hydraulic system 60 also includes a forward direction valve assembly 62 coupled to the controller 52 and the cylinder assembly 44 and a backward direction valve assembly 64 coupled to the controller 52 and the cylinder assembly 44. The forward direction valve assembly 62 and the backward direction valve assembly 64 each include inlet and outlet valves, respectively. And each valve assembly is configured to control motion in one direction. For instance, the forward direction valve assembly 62 controls fluid into and out of the cylinder assembly 44 to control forward motion. The backward direction valve assembly 64 controls fluid into and out of the cylinder assembly 44 to control backward motion.

The hydraulic system 60 also includes a pump 66 coupled to an inlet of the forward direction valve assembly 62 and an inlet of the backward direction valve assembly 64, and a fluid reservoir 68 coupled to an inlet of the forward direction valve assembly 62 and an outlet of the backward direction valve assembly 64.

Figure 4:
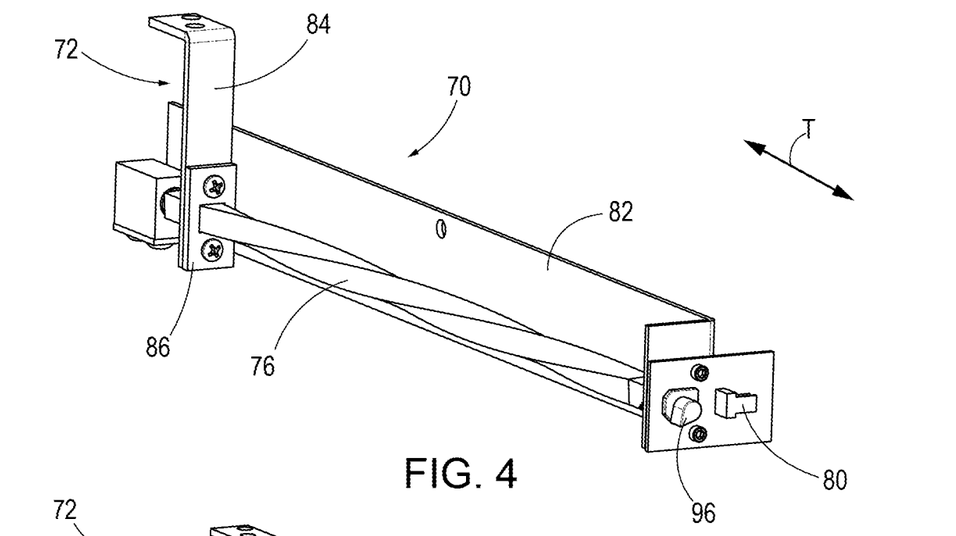
FIG. 4 is a perspective view of a sensor assembly incorporated into the dental chair shown in FIG. 1, according to an embodiment of the present disclosure.
Figure 5:
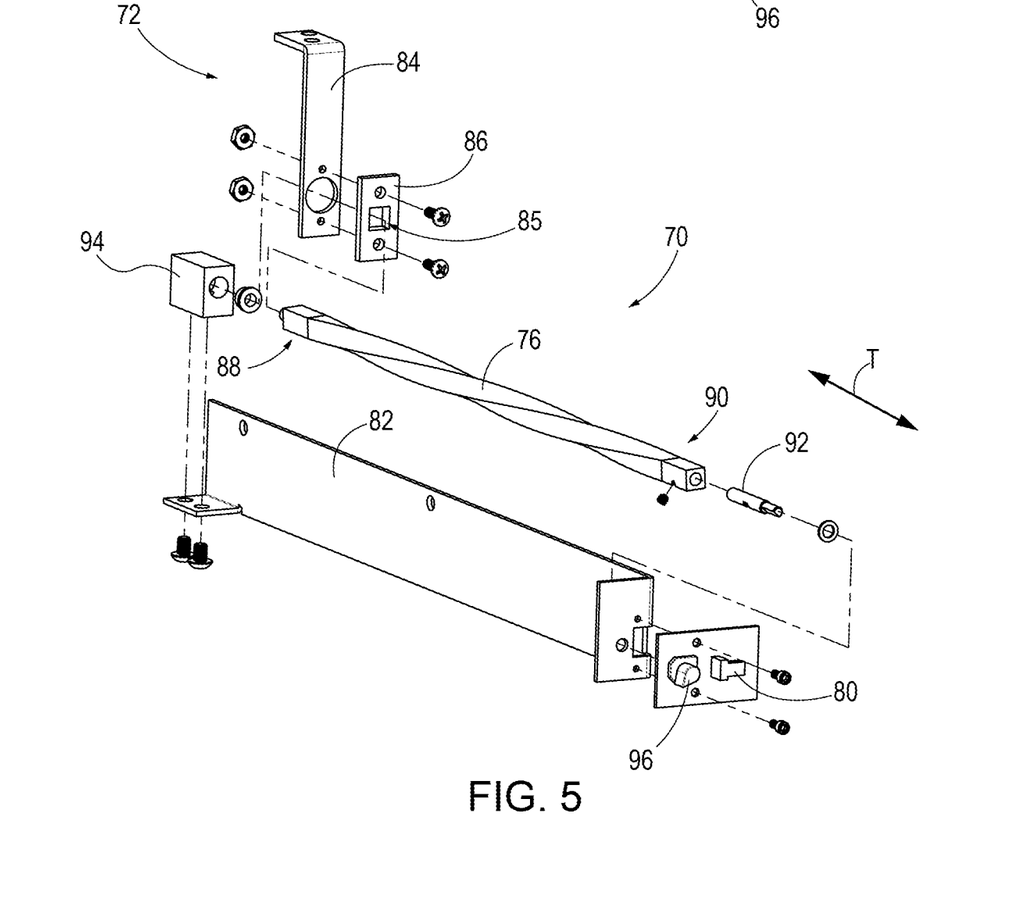
FIG. 5 is an exploded view of the sensor assembly shown in FIG. 4.

FIGS. 4 and 5 illustrate a sensor assembly according to an embodiment of the present disclosure. The sensor assembly 70 is configured to measure linear distance of travel of the seat assembly 26 along the forward-backward direction T. As shown, the sensor assembly includes a bracket assembly 72, a rod 76, and a potentiometer 80. A mounting plate 82 is coupled to a guide track 24b and is configured to support the rod 76 and the potentiometer 80.

The bracket assembly 72 includes a mount 84 and bracket plate 86. The mount 84 is coupled to a lower surface 22l of the platform 22. Accordingly, as the platform 22 traverses in the forward-backward direction so does the mount 84 and the bracket plate 86. The bracket plate 86 is fixed to the mount 84 and further defines an opening 85 having a cross-sectional shape through which the rod 76 extends.

The rod 76 is rotatably fixed to the traverse motion assembly. As shown, the rod 76 has a first end 88, a second end 90 opposite the first end 88, and a rod cross-sectional shape. A gear shaft 92 is coupled o the second end 90. A housing 94 is fixed to the mounting plate 82 and rotatably carries the first end 88 of the rod 76 via a bearing assembly so that the rod is can freely rotate. The second end 90, for example, the gear shaft 92, carries a detecting end 96 that is positioned proximate the potentiometer 80.

Continuing with FIGS. 4 and 5, the rod 76 has a cross-sectional shape that corresponds to the cross-sectional shape of opening in the bracket plate 86. The rod cross-sectional shape and the cross-sectional shape of the opening are selected so that any movement of the bracket plate cause the rod to rotate. In the embodiment shown, the cross-sectional shape of the rod 76 in generally square. However, the rod cross-sectional shape can have shape other than a strictly circular. In addition, the rod 76 itself have a degree of twist and can be considered a twist rod. Furthermore, only a portion of rod 76 may have twist. Because the rod cross-section generally corresponds to the opening of the bracket plate 86, as the chair assembly 20, via the platform 22, moves in the forward backward direction T, the twist in the rod 76 cause the rod 76 to rotate. Accordingly, the rod 76 is configured to rotate a) in a first rotational direction when the chair assembly moves in a forward direction F, and b) in a second rotational direction that is opposite the first rotational direction when the chair assembly moves in a backward direction B that is opposite the forward direction F. Furthermore, it can be seen that the rod 76 has a degree of twist that corresponds to a maximum linear distance of traverse of the seat in the forward-backward direction T. Rotation of the rod 76, due to the degree of twist in the rod, is also indicative of the linear distance the platform 22 traverses. Accordingly, as the rod 76 rotates, the potentiometer 80, which is proximate the detecting end 96 of the rod, obtains data indicative of the linear distance that chair assembly has traversed.

The processor 58 is electronically coupled to the potentiometer. In response to receiving data indicative of rotational movement of the rod, the processor 58 configured to determine a linear distance traveled by the chair assembly in the forward-backward direction T. The linear distance traveled may be used by the controller aid in the monitoring and control of the chair assembly, as further described below.

Figure 6:
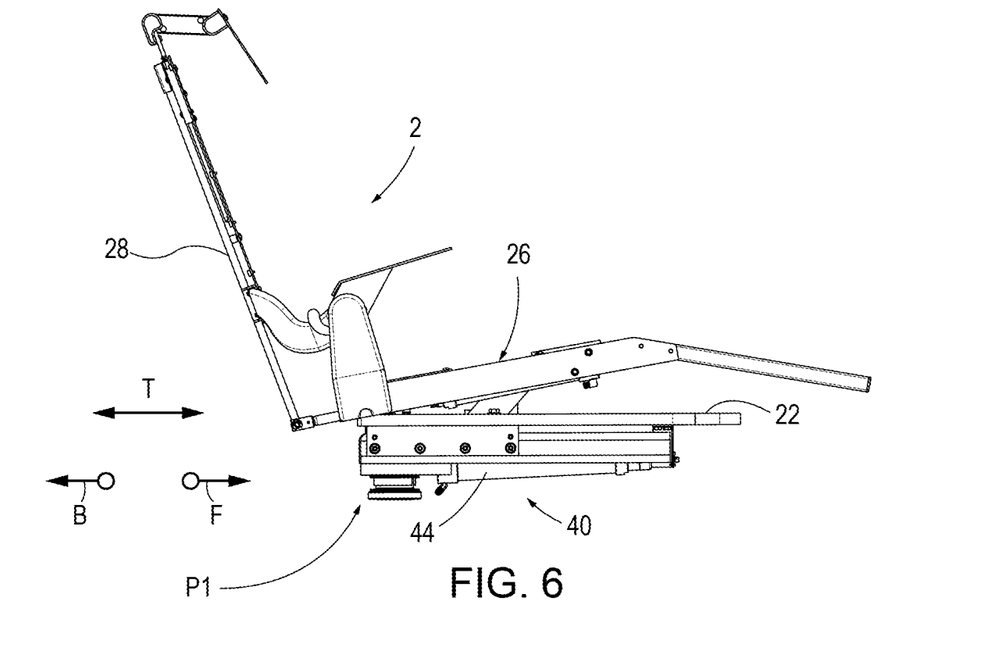
FIG. 6 is a side view of a top portion of the dental chair shown in FIG. 1 with a chair assembly in a first position.
Figure 8:
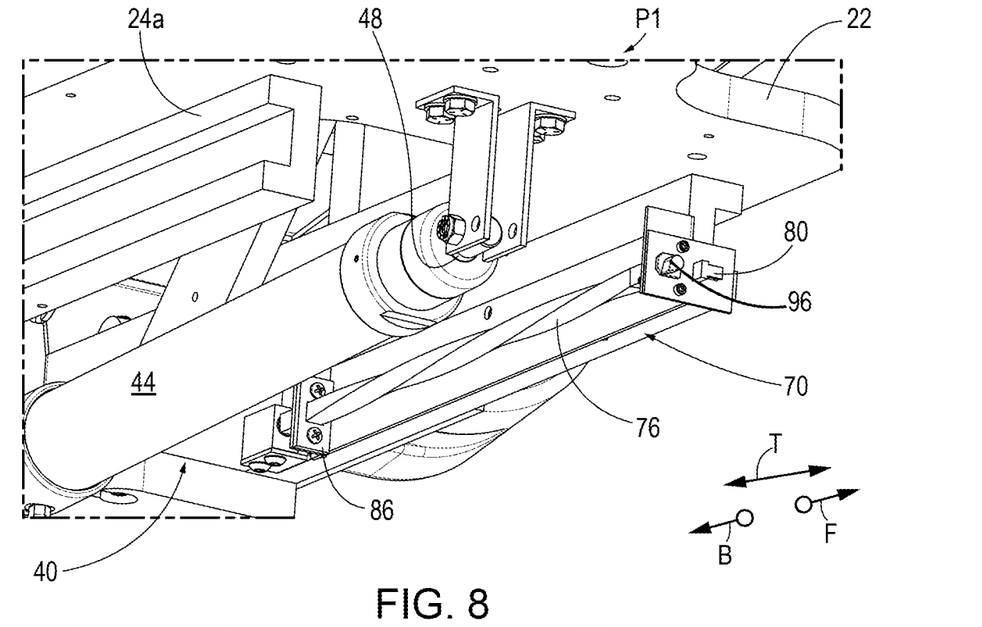
FIG. 8 is a detailed view of the traverse motion assembly and the sensor assembly shown FIG. 4 when the chair assembly is the first position, as shown FIG. 6.

The processor can determine and then implement control instructions to move the chair between desired positions. The processor can also determine, based on the data obtained from the potentiometer, the linear distance of seat is currently from a first position P1, as shown in FIGS. 6 and 8. The first position may be a zero position or null position but is not always so. This allows the processor to determine in what direction the seat assembly 26 must traverse to arrive a preset position or traverse back to the null or zero position. Thus, if the current position differs from a desired position, the processor determines if the seat should traverse in a forward direction or a backward direction. If the processor determines the seat needs to move in the forward direction, the processor causes the forward direction valve assembly to open, thereby permitting the piston to activate and move the seat the forward direction. If the processor determines the seat needs to move in the backward direction, the processor causes the backward direction valve assembly to open, thereby permitting the piston to activate and move the seat the backward direction.

Figure 7:
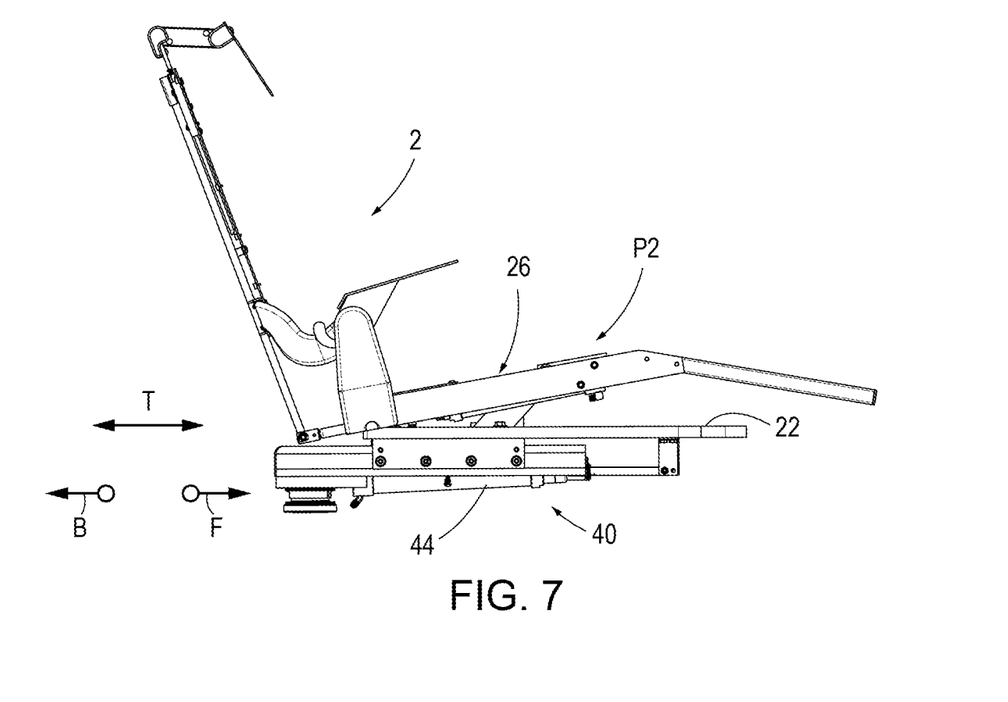
FIG. 7 is a side view of the dental chair shown in FIG. 3, showing the chair assembly traversed in a forward-backward direction into a second position.
Figure 9:
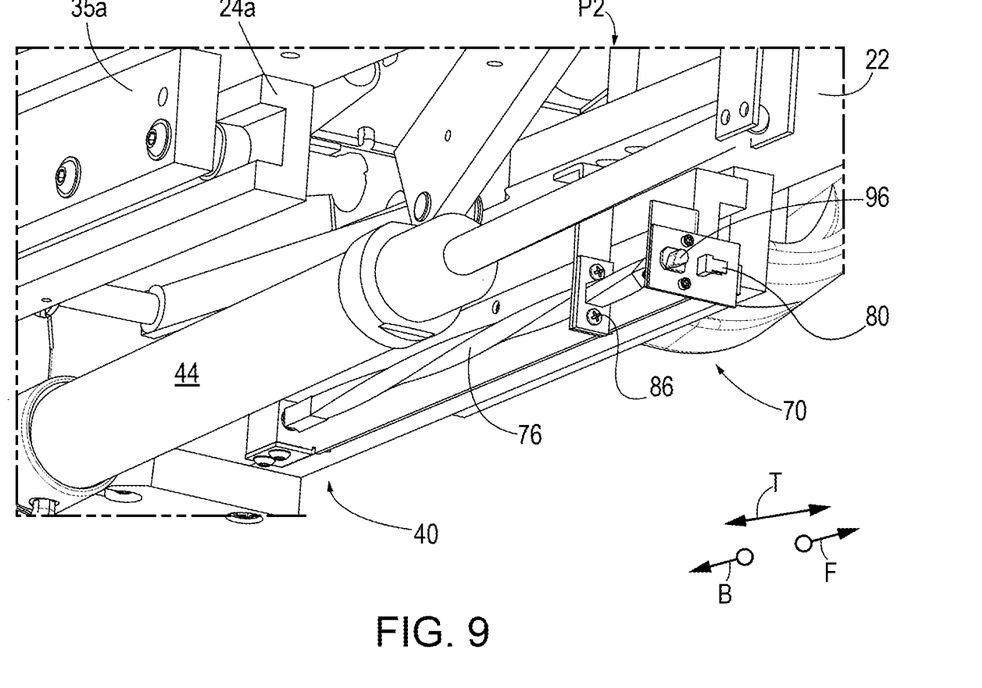
FIG. 9 is a detailed view of the traverse motion assembly and the sensor assembly shown FIG. 4 when the chair assembly is the second position, as shown FIG. 7.

Referring to FIGS. 6-9, in use, the controller 52 adjusts or change the position of the seat assembly 26 based on data generated by the sensor assembly. FIGS. 6 and 8 shows a seat assembly 26 in the first position P1. In FIG. 8, the bracket plate 86 is in a backward position. As the controller 52 activates the cylinder assembly 44, the platform 22 and bracket plate 86 are advance in the forward direction F. This, in turn, cause the rod 76 to rotate, which generates responsive data or signals in the potentiometer 80. FIGS. 7 and 9 show the seat assembly 26 in a second position P2 that is different from the first position P1. In FIG. 9, the bracket plate 86 is shown in a more forward position closer to the potentiometer 80. The rotation of the rod 76 and the platform 22, and thus the seat assembly 26, traverses forward, generating data indicate of the linear distance that the platform 22, and thus seat assembly 26, has traveled to arrive the second position P2 as illustrated.

In use practice, the dental chair 2 is configured permit a user to select a desired position of a dental chair 2 with the interface 54. The processor 58 may determine a current position of the dental chair 2 using preset positions and any needed data logs. An analog to digital converter may be used to convert the current position data into digital data. The processor 58 can then, based on the digital data of the current position, determine a linear distance between a current position of the dental chair and the desired position of the dental chair. Next, the chair is activated, causing the dental chair to traverse along a forward-backward direction T from the current position to toward the desired position. Then, the sensor assembly 70 and a processor 58 determine a distance of linear movement of the dental chair along the forward-backward direction T. In this regard, the distance of linear movement is determined based on rotational movement of a rod 76 caused by traverse of the dental chair along forward-backward direction T. The control system 50 can then stop traverse of the dental chair along the forward-backward direction T when the distance of linear movement is substantially equal to the linear distance determined between the current position of the dental chair and the desired position of the dental chair.

The present disclosure has emphasized that the dental chair 2 is configured to traverse the seat assembly 26 in a forward-backward direction T using a traverse motion assembly 40. It should be appreciated, that the dental chair includes addition motion assemblies. For instance, the dental chair 2 may include a motion assembly that cause 1) back to recline relative to the seat, the seat and back to tilt, 2) the legs to extend and retract, and 3) the entire chair assembly to be elevated relative to the floor or lowered closer to the floor. Each motion assembly may include its respective sensors and motion control features. In some embodiments, the control system 50 may be used to control operation of these motion control assemblies. In one example, the dental chair further comprises a sensor configured to detect a position of the back. Based on the sensor detecting the position of the back, the processor can determine a position of the headrest. In alternative embodiments, however, the dental chair may further include a sensor configured to detect a position of the headrest. In each case, the sensors may be electronically coupled to the controller 52 and its respective motion assembly.

While the disclosure is described herein, using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in an order as desired.

The invention claimed is:

1. A dental chair, comprising:
   a chair assembly configured to support a patient;
   a traverse motion assembly coupled to the chair assembly, the traverse motion assembly configured to move the chair assembly in a forward-backward direction between a first position and a second position; and
   a sensor assembly having:
   a rod rotatably fixed to the traverse motion assembly, the rod defining a first end, a second end opposite the first end, and a rod cross-sectional shape;
   a bracket plate fixed to the chair assembly so that the bracket plate moves with the chair assembly in the forward-backward direction, the bracket plate defining an opening having a bracket plate cross-sectional shape through which the rod extends, wherein the bracket plate cross-sectional shape corresponds to the rod cross-sectional shape such that movement of the chair assembly in the forward-backward direction causes rotation of the rod;
   a gear shaft coaxially coupled to the second end of the rod;

a detecting end coaxially coupled to the gear shaft; and
a potentiometer positioned proximate to the detecting end in a non-coaxial orientation with the detecting end, wherein the potentiometer is configured to obtain data indicative of rotational movement of the rod via the detecting end, wherein the data indicative of rotational movement of the rod corresponds to a distance of linear movement of the chair assembly along the forward-backward direction between the first position and the second position.

2. The dental chair of claim 1, further comprising a processor coupled to the potentiometer, the processor configured to determine a linear distance traveled by the chair assembly in the forward-backward direction based on the data indicative of rotational movement of the rod.

3. The dental chair of claim 2, wherein the processor is configured to determine a current position of the chair assembly, and in response to the determination of the current position of the chair assembly, cause the chair assembly to move in either a forward direction or a backward direction that is opposite the forward direction.

4. The dental chair of claim 2, further comprising a control system comprising:
a controller having A) the processor, B) a memory unit in electronic communication with the processor, the memory unit configured to store preset positions therein, and C) an interface in electronically communication with the controller and the memory unit, wherein the processor further is configured to, in response to inputs obtained from the interface, cause the chair assembly to move from a first position into a second position that is different from the first position along the forward-backward direction.

5. The dental chair of claim 4, wherein the control system further comprises:
a forward direction valve assembly coupled to the controller;
a backward direction valve assembly coupled to the controller;
a hydraulic cylinder coupled to the forward direction valve assembly, the backward direction valve assembly, and the chair assembly;
a pump coupled to an inlet of the forward direction valve assembly and an inlet of the backward direction valve assembly; and
a fluid reservoir coupled to an inlet of the forward direction valve assembly and an outlet of the backward direction valve assembly.

6. The dental chair of claim 1, wherein the rod is configured to rotate a) in a first rotational direction when the chair assembly moves in a forward direction, and b) in a second rotational direction that is opposite the first rotational direction when the chair assembly moves in a backward direction that is opposite the forward direction.

7. The dental chair of claim 1, wherein the chair assembly includes a platform coupled to the chair assembly; and a pair of roller assemblies coupled to the platform, wherein the traverse motion assembly further comprises:
a mounting plate;
a pair of tracks coupled to the mounting plate and that receive the pair of roller assemblies, respectively; and
a cylinder assembly having a first end coupled to the mounting plate, and a second end coupled to the platform, wherein the cylinder assembly is configured to move the chair assembly in the forward-backward direction.

8. The dental chair of claim 7, wherein the cylinder assembly include a hydraulic piston.

9. The dental chair of claim 1, further comprising a base configured to support the dental chair and rest on a floor, wherein the chair assembly has a headrest, a back coupled to the headrest, and a chair assembly coupled to the back.

10. The dental chair of claim 1, wherein the chair assembly further comprises a sensor configured to detect a position of the back.

11. The dental chair of claim 1, wherein the chair assembly further comprises a sensor configured to detect a position of the headrest.

12. The dental chair of claim 1, wherein the chair assembly further comprises a back, a first armrest and a second armrest, the first armrest and the second armrest coupled to opposite sides of the back, wherein the first armrest and the second armrest are each adjustable.

13. The dental chair of claim 12, wherein the chair assembly further comprises a sensor configured to detect a position of the first armrest and the second armrest.

14. A sensor assembly for a dental chair having a traverse motion assembly, the sensor assembly comprising:
a rod configured to be rotatably fixed to the traverse motion assembly, the rod defining a first end, a second end opposite the first end, and a rod cross-sectional shape;
a bracket plate defining an opening having a bracket plate cross-sectional shape, wherein the bracket plate cross-sectional shape corresponds to the rod cross-sectional shape such that movement bracket plate in a forward-backward direction causes rotation of the rod;
a gear shaft coaxially coupled to the second end of the rod;
a detecting end coaxially coupled to the gear shaft;
a potentiometer configured to be coupled to the traverse motion assembly proximate to the detecting end in a non-coaxial orientation with the detecting end, wherein the potentiometer is configured to obtain data indicative of rotational movement of the rod via the detecting end; and
a processor coupled to the potentiometer, the processor configured to determine a linear distance traveled by the chair in the forward-backward direction based on the data indicative of rotational movement of the rod obtained by the potentiometer.

15. The sensor assembly of claim 14, further comprising:
a mounting plate; and
a housing fixed to the mounting plate that rotatably carries the first end of the rod, wherein the first end of the rod is configured to freely rotate in within the housing.

16. The sensor assembly of claim 14, wherein the rod is configured to rotate a) in a first rotational direction when the bracket plate moves in a forward direction, and b) in a second rotational direction that is opposite the first rotational direction when the bracket plate moves in a backward direction that is opposite the forward direction.

17. The sensor assembly of claim 14, wherein rod-cross sectional shape is substantially non-circular.

18. The sensor assembly of claim 14, wherein the rod is a twisted rod.

19. The sensor assembly of claim 18, wherein the twisted rod has a degree of twist that corresponds to a maximum linear distance of traverse of the chair assembly in the forward-backward direction.

20. A method, comprising:
selecting a desired position of a dental chair with an interface of a control system;

determining a linear distance between a current position of the dental chair and the desired position of the dental chair;

causing the dental chair to traverse along a forward-backward direction from the current position to toward the desired position;

determining, with a sensor assembly and a processor, a distance of linear movement of the dental chair along the forward-backward direction, wherein the distance of linear movement is determined based on rotational movement of a rod based on data from a potentiometer received via a detecting end coaxially coupled to a gear shaft, the gear shaft coaxially coupled to an end of the rod, the potentiometer positioned proximate to the detecting end in a non-coaxial orientation with the detecting end, the rotational movement of the rod caused by traverse of the dental chair along the forward-backward direction; and stopping traverse of the dental chair along the forward-backward direction when the distance of linear movement is substantially equal to the linear distance determined between the current position of the dental chair and the desired position of the dental chair.

21. The method of claim 20, further comprising determining a current position of the dental chair via a processor.

22. The method of claim 20, further comprising converting the data indicative of the current position into digital data via an analog to digital converter.

* * * * *